3,063,905
CARBOXY METHYL BENZYL DEXTRAN
DEXTRO-AMPHETAMINE
Leo J. Novak, Dayton, Ohio, assignor to Central
Pharmacal Company, Seymour, Ind.
No Drawing. Filed Aug. 21, 1959, Ser. No. 835,189
11 Claims. (Cl. 167—82)

This invention relates to a method of making a pharmaceutical drug composition having controlled timing for the release of the drug.

It is an object of the invention to provide a pharmaceutical drug which is combined with carboxy methyl-benzyl dextran (CMBD) for controlling the release of the drug constituent.

In accordance with the invention it has been discovered that dextran derivatives, particularly the carboxy alkyl benzyl derivatives of dextran, can be combined with pre-chosen drugs to control and regulate the rate of release of the drug, whereby the rate of liberation of the same is decreased and made effective over a much longer period of time.

A further object of the invention is to provide a drug product, wherein CMBD is combined therewith, for example dextroamphetamine (DA) or its salts, to control the rate of liberation or adsorption of the DA as the product passes through the gastro-intestinal tract and is assimilated into the blood stream. In this way, the physiological and pharmacological effects of the drug are controlled and made effective over a prolonged period of time as desired in most cases.

Another object of the invention is to provide a pharmaceutical product having a predetermined unit drug dose and which may be in the form of a tablet or pellet and taken orally. Control of the concentration of the drug reelased into the blood stream, particularly where the drug is desired to be released into the blood stream over a prolonged period of time, is regulated by combining the drug with a carboxymethyl dextran benzylated to provide a high benzyl D.S. (degree of substitution) and relative low carboxyl D.S.

In conventional drugs of the prior art which are compounded for oral administration, the same are absorbed rapidly in the stomach and intestinal tract and thus produce a relatively high concentration of the drug in the blood stream in a short period of time. This rapid release and absorption into the blood stream of the drug is undesirable except in special cases. The rapid release and the building up of a high concentration of a drug often produces undesirable physiological and pharmacological reactions, and the desired effects of the drug are not produced. The present invention makes it possible to overcome this difficulty and provides an improved pharmaceutical drug product which, when taken orally, slowly liberates the drug for absorption into the blood stream. This rate is controlled, whereby the drug remains effective over a relatively long period of time, and the undesirable abnormal physiological reactions, such as usually produced when the drug is rapidly released and absorped into the blood stream, are eliminated.

In accordance with the invention, carboxy methylated dextran is made as follows:

*Example I*

Dextran (clinical B 512 dextran mol. wt. 70,000) is dissolved and reacted in 200 mls. of water with sodium monochloroacetate, using a molar ratio of acetate to dextran of 0.5 to 1, the reaction being carried out at 40° C. This produces a carboxymethyl dextran having a low D.S. of carboxymethyl which is desired.

The resultant sodium carboxymethyl dextran is then benzylated by reacting the same with benzyl chloride employing a molar ratio of benzyl chloride to sodium carboxymethyl dextran of between 3:1 and 6:1, and preferably 6:1. This produces a carboxymethyl benzyl dextran having a high benzyl D.S. and a low carboxymethyl D.S. The resultant CMBD is then combined with the drug which is to be employed as the medicine. For example, dextroamphetamine may be combined with CMBD as follows:

*Example II*

60 grams of CMBD as described in Example I are stirred into 300 mls. of hot (80° C.) isopropyl alcohol and 10 grams of stearic acid. To this solution are then added 10 grams of dextro-amphetamine hydrochloride (DA—HCl) while stirring the mixture. The resultant solution is then dried under vacuum at 70° C. yielding 69 grams of carboxymethyl dextro-amphetamine hydrochloride (CMBD—DA—HCl). This CMBD—DA—HCl, when tested in intestinal gastric juice at a pH of 1.3 and temperature of 37° C. was found to release between 10% and 15% of its dextro-amphetamine hydrochloride content in about 4 hours. A quantity of 10 to 15% of DA—HCl is released in approximately 8 hours when a like quantity is immersed in intestinal gastric juice having a pH of 7.5 and temperature of 37° C. The addition of stearic acid overcomes the tendency of CMBD—DA to hydrate and agglomerate at temperatures of about 40° in aqueous media.

The amount of CMBD in the complex product may vary depending generally upon the drug used. Preferably the CMBD content of the product is between 1 and 50% by weight of the pharmaceutical product.

To obtain the improved results it is essential to provide a CMBD product having a low carboxymethyl D.S. and a high benzyl D.S. The D.S. of carboxymethyl is held to 1.5 and the D.S. of benzyl to 1.5. Such a CMBD product has been found to release the drug slowly as desired over a prolonged period of time. The rate of release of the DA—HCl in the CMBD—DA—HCl product described is controlled by the CMBD having the D.S. factors aforementioned. Where the D.S. factors of the CMBD are changed, for example, having a high D.S. of carboxymethyl and low benzyl D.S., a CMBD—DA—HCl product made therefrom, the DA—HCl is released at a more rapid rate which may be undesirable or not depending upon the dose time characteristics desired.

The invention provides a new class of dextran derivatives which can be combined with a pre-selected drug of combination of drugs to control the release of the drugs. A sustained release pharmaceutical product for introduction into the intestinal tract is provided by suitably combining a drug which is to be administered, with CMBD having a low carboxyalkyl D.S. and high benzyl D.S. as aforementioned. Such a drug product, when taken orally, has a delayed releasing action, as the drug porduct passes through the gastro-intestinal tract, whereby the beneficial effect of the drug is extended over a much longer period of time than is otherwise possible. The CMBD constituent of the CMBD—DA—HCl product described controls the rate of release of DA—HCl since the D.S. factors determine the hydratability e.g., the compatability of the CMBD in water and aqueous saline solutions.

Various drugs may be combined with the CMBD as described to form the CMBD-drug product having the slow release rate controlled action when taken orally or introduced into the intestinal tract.

The invention is further exemplified by the following examples:

*Example III*

25 grams (gms.) of carboxymethyl benzyl dextran (CMBD of Example I) are dissolved in 250 mls. of hot (75° C.) methyl alcohol. To the resultant solution are added 5.3 gms. of dextro-amphetamine (DA) and the solution is vacuum-dried (1 mm. Hg) for 24 hours at 70° C. Yield of 29 gms. of CMBD—DA complex is obtained.

*Example IV*

50 grams of CMBD (Example I) are dissolved in 300 mls. of hot methyl alcohol containing 10 gms. stearic acid and 10 gms. of dextro-amphetamine hydrochloric acid (DA—HCl). The resultant solution is vacuum dried for 24 hours at 70° C. to recover 70 gms. of CMBD—DA—HCl which is pressed into pellets containing 100 mg. tablets. The incorporation of stearic acid increases the time delay about 10% over the product of Example II. Other fatty acids may be used such as those containing 10 to 24 carbon atoms.

*Example V*

In this instance, penicillin was substituted for DA as in Example III to form a CMBD-penicillin complex.

*Example VI*

A CMBD-streptomycin complex product as in Example V is produced by substituting streptomycin for penicillin.

*Example VII*

In this case, chloroprophenyridamine (ClDA) is used in place of DA, as in Example III, to prepare a CMBD—ClDA complex.

The dextran which is carboxymethylated to obtain a carboxymethyl dextran for use in forming the complex CMBD-drug product preferably is one having an average molecular structural repeating alpha-1,6 linkage to non-alpha-1,6 linkages ratio between 1.9:1 and 30:1, a molecular weight between 5,000 and 100,000 as determined by light scattering measurements, a solubility or dispersibility in water such as to yield colloidally stable aqueous solutions or dispersions of from 0.5% to 50% by weight concentration, and a colloidal osmotic pressure in liquids of from 1 mm. Hg to 300 mm. Hg.

Dextran may be produced enzymatically in the presence of bacteria, for example by inoculating a nutrient medium containing sucrose, particular nitrogenous compounds and certain inorganic salts with an appropriate microorganism, such as those of the *Leuconostoc mesenteroides* and *L. dextranicum* types and incubating the culture at the temperature most favorable to the growth of the particular microorganism.

In one method of obtaining a dextran to be reacted with the carboxyalkylating agent to form the carboxy methyl dextran there is first prepared an aqueous nutrient medium which may have the following composition:

| | Percent by weight |
|---|---|
| Sucrose | 20 |
| Corn steep liquor | 2 |
| Monobasic potassium phosphate | 0.5 |
| Manganous sulfate | 0.002 |
| Sodium chloride | 0.50 |
| Water | Balance |

This medium is adjusted to a pH of between about 6.5 and about 7.5, preferably 7.2, and then sterilized. The material is cooled to room temperature and inoculated with a culture of, for example, *Leuconostoc mesenteroides* B 512 (NRRL) and incubated at 20° to 30° C. (optimum 25° C.), until a maximum yield of dextran has been attained; normally a period of between 12 and 48 hours will be satisfactory for this procedure. The fermented product contains approximately 80 to 85% of water and is a thick turbid liquid.

Upon completion of the fermentation, which process renders the material somewhat acid, that is, to a pH of 3.5–5.5 (average 4.2), calcium chloride is added to the ferment to bring the pH thereof to about 7.0 to 8.0. This aids in the precipitation of phosphates. Thereafter, acetone or alcohol, which may be a water-miscible aliphatic, such as methyl, ethyl, or isopropyl, is added in sufficient quantity to precipitate the dextran and this brings down, with the dextran, occluded and adsorbed bacteria, and nitrogenous and inorganic elements. To occasion complete precipitation of the dextran it may be desirable to allow the mix to stand for a relatively long period, such as about 6 hours. The precipitated dextran may be dried in any suitable manner, for example by drum drying. Thereafter, it may be reduced to particulate condition which is the preferred form in carrying out the reaction with the carboxy methylating agent.

A purer dextran may be obtained by adding an aliphatic alcohol to the fermented culture at a pH between about 2.5 and 4.5. The precipitate thus obtained may be further purified by again precipitating it with the alcohol. Several precipitations may be performed.

The dextran may be obtained by inoculating the culture medium with microorganisms other than that mentioned above. Thus it may be a water-soluble dextran obtained by the use of the microorganisms bearing the following NRRL classifications: *Leuconostoc mesenteroides* B–119, B–1146, B–1190, or a water-insoluble or substantially water-insoluble dextran obtained by the use of *Leuconostoc mesenteroides* B–742, B–1191, B–1196, B–1208, B–1216, B–1120, B–1144, B–523, *Streptobacterium dextranicum* B–1254 and *Betabacterium vermiforme* B–1139.

The dextran is not limited to one prepared under any particular set of conditions, including the microorganism used. It may be produced enzymatically, in the substantial absence of bacteria, by cultivating an appropriate microorganism, for example, *Leuconostoc mesenteroides* B–512 to obtain a dextran-producing enzyme, separating the enzyme from the medium in which it is produced, and introducing the enzyme into a medium in which dextran is produced by the action of the enzyme. Also, the dextran may be obtained by bacterial conversion of 1.4 linkages of dextrin to 1.6 linkages of dextran.

The carboxy methyl benzyl dextran drugs or salts of physiologically active organic bases may be prepared in any convenient dosage form. They may take the form of dry powders for use as such, to be mixed with water or a suitable liquid or non-liquid diluent to form pastes or wax-like masses, compressed into tablets, pills or pellets, or packaged in dry-filled or soft elastic capsules. The compositions may also be made up as solutions or dispersions which may be sealed in ampoules. The pastes or the like, such as those comprising a carboxy methyl benzyl dextran salt of streptomycin may be applied topically to affected areas, or as fillings for body cavities such as post-extraction cavities in dentistry. Tablets, pills and capsules may be administered in the form of pellets which are implanted subcutaneously. Compressed preparations and ampoules may be used to prepare solutions or dispersions for injection or infusion. Solutions or dispersions of the salt in suitable liquid vehicles may be administered by intravenous, intramuscular, sublingual, subcutaneous, rectal, intraspinous or intrathecal injection, or infused into body cavities such as the vaginal or urinary tract. The vehicle may be water or aqueous saline solutions, or it may be any other liquid or oleaginous vehicle which is tolerated by the body, such as an organic solvent of the type of glycerine and the lower alkylene (1 to 4 carbons) glycols, soya bean, sesame or other fatty oil including hydrogenated peanut oil, or a mixture of oils with beeswax.

The selection of the vehicle will be determined by the method of administering the drug or medicinal salt, aqueous solutions being adapted for intravenous injection, non-aqueous solutions and dispersions being adapted to other injection methods, for example, intramuscular and subcutaneous. The selection of the dextran to be carboxy methylated and benzylated to produce the neutralizing carboxy methyl benzyl dextran may also be predicated on the mode of administering the drug. For some purposes, such as topical application, the "native" dextrans, or dextrans of relatively high molecular weight, which may be more or less slowly soluble in water, are suitable. However, lower molecular weight dextrans may be used and in some cases, such as when the salt is to be administered by injections, and especially intravenously, water-soluble dextrans having an average molecular weight between 20,000 and desirably between 70,000 and 85,000 are most efficacious. Such water-soluble lower molecular weight dextrans may be obtained directly under pre-determined and correlated conditions, or they may be obtained by hydrolysis of a high molecular weight dextran in any suitable manner, as by means of acid or enzymatically. If the dextran as obtained initially has the desired combination of physical properties, it may be carboxy methyl benzylated as described, after appropriate purification including deionization and decolorization. If dextran is to be hydrolyzed by acid to reduce its molecular weight and render it water-soluble or increase its solubility in water this may be accomplished before or after separation of the dextran from the medium in which it is produced. Procedures for the acid hydrolysis of high molecular weight dextrans, such as that from *Leuconostoc mesenteroides* B–512, and for fractionating the hydrolysis product to obtain so-called "clinical" dextran of the proper molecular weight for intravenous injection are known and may be followed.

When the carboxy methyl benzylated dextran salt of the organic base is to be mixed as a powder with other adjuvants, such as excipients in the case of pills, the ingredients of the composition may be mixed by usual milling techniques. Aseptic conditions should be maintained throughout the preparation of the compositions in order to insure their stability.

Parenteral injection fluids may be prepared by dissolving the asceptically sterile salt of the base and carboxy methyl ether derived from clinical dextran in water which may or may not contain added sterile, pyrogen-free sodium chloride. The fluids are generally neutral but, if necessary, may be adjusted to the pH desired for injection, usually 7±0.5.

When the CMBD-drug is used to prepare parenteral injection fluids, the initial particle size of the salt is not critical, except that a small particle size is desirable to facilitate dissolution of the salt in the menstruum. However, the particle size is more critical when suspensions or dispersions for intramuscular injection are prepared, and must be such that the suspension or dispersion will pass through the bore of the needle, usually a 20-gauge needle. In general, a particle size of from 50 to 400 microns is satisfactory, a particle size of 50 to 100 microns being generally preferred.

The concentration of the CMBD-drug or salt in the parenteral injection fluid or other composition will vary depending on the base, the purpose for which the product is used, the method of administration, and at the discretion of the physician.

The carboxymethyl benzyl dextran having a D.S. of between 0.5 and 1.0 carboxymethyl group per anhydroglycopyranosidic unit of the dextran, associated with the physiologically active organic base in salt combination, exerts an osmotic effect, exhibits a protective colloidal action, and functions as a large-molecule "diluent" for the base which diluent is digested slowly in the body. By reason of this slow digestion of the carboxymethyl benzyl dextran and the osmotic effect which it exerts, it serves to control the rate at which the base is released to the system, thus prolonging the effectiveness of the base for any given dosage thereof administered. Less frequent injections are required to maintain the desired blood level of the base and since the rate of release of the base in the system is retarded, and the full effect thereof is not experienced immediately or abruptly, the amount of those drugs which may be safely administered in a given dosage is somewhat less critical than is normally the case. Also, the carboxymethyl benzyl dextran salts or drugs are somewhat bulky and there is less danger of overdosage when those salts of highly dangerous drugs, such as strychnine, scopolamine, atropine or pilocarpine, are injected than is the case when these drugs are injected in the form of their inorganic salts. The inorganic salts of such drugs must be injected in minute amounts, whereas larger amounts of the bulkier carboxymethyl benzyl dextran salts may be injected safely. In addition, the carboxymethyl dextran salts of the bases are less "harsh" than hydrochlorides, sulfates, etc., and are, therefore, more acceptable physiologically.

The carboxymethyl benzyl dextran salts have the important advantage that by selection of the dextran and the extent of carboxymethylation thereof up to the permissible limit of an average of about 1.0 carboxymethyl group per anhydroglucopyranosidic unit of the dextran, it is possible to control the molecular weight and viscosity, osmotic and solubility characteristics of the ether. This, in turn, permits accurate control of the properties of the salt, including the amount of physiologically active organic base chemically combined with the carboxy methyl benzyl dextran so that it is possible to control accurately, pharmacological properties of the salt particularly with regard to dosage form, physiological response, prolongation of the responses at a predetermined level of intensity, rate of absorption of the base, toxicity of the base, stability of the base, etc.

A wide variety of physiologically active organic bases may be neutralized as described herein to produce the carboxy methyl benzyl dextran salt thereof. Specific examples are the alkaloids already mentioned herein, the synthetic drug substitute emperidine, codeine, ephedrine, quinine and organic base substitutes therefor, quinidine, nicotine, cinchonidine, apomorphine, etc., as well as those water-soluble antibiotics which may be classified as organic bases. The bases may be liberated from their more readily available inorganic salts by adding sufficient of an alkali metal hydroxide, such as sodium or potassium hydroxide, to an aqueous solution of the salt, to adjust the pH thereof to the alkaline side.

The following examples will illustrate the neutralization of specific bases, it being understood that the invention is not limited thereby since other bases may be neutralized and converted to salts by the same general procedure.

The medicament drugs may be combined with the CMBD to form a time delay pharmaceutical product. For example, various water-soluble medicament salts such as amphetamine sulfate, racemic amphetamine sulfate as well as antihistamines and barbiturates. Inert fillers may be added in suitable amounts as desired, e.g. terra alba, starch and the like, and such as is commonly added in the formulation of tablets of the product.

Various changes and substitutions may be made by those skilled in the art to obtain the advantages and achieve the results of this invention and it is understood such changes and variations are within the scope of the foregoing except as restricted in the claims.

What is claimed is:

1. A sustained release pharmaceutical product for introducing into the intestinal tract comprising a dextroamphetamine drug combined with carboxy methyl benzyl dextran which is resistant to disintegration and slowly releases the drug in the gastro-intestinal tract, said carboxy methyl benzyl dextran comprising 1 to 50% by weight of said pharmaceutical product, said carboxymethyl benzyl dextran having the D.S. of carboxymethyl held to 1.5 and the D.S. of benzyl held to 1.5.

2. A sustained release pharmaceutical product for introducing into the intestinal tract comprising a dextroamphetamine drug combined with carboxy methyl benzyl dextran which is resistant to disintegration and slowly releases the drug in the gastro-intestinal tract, said carboxy methyl benzyl dextran having a low carboxy methyl D.S. of 1.5 and a high benzyl D.S. of 1.5.

3. The method of forming a sustained release pharmaceutical product which comprises reacting carboxy methyl benzyl dextran with a dextroamphetamine drug to form a complex product having sustained release properties, said carboxymethyl benzyl dextran having the D.S. of carboxymethyl held to 1.5 and the D.S. of benzyl held to 1.5.

4. The method of forming a sustained release pharmaceutical product which comprises reacting carboxy methyl benzyl dextran with a dextroamphetamine drug to form a complex product having sustained release properties, said carboxy methyl benzyl dextran having a low carboxy methyl D.S. of 1.5 and a high benzyl D.S. of 1.5.

5. A sustained release pharmaceutical product for introducing into the intestinal tract comprising a complex consisting essentially of dextro-amphetamine and carboxymethyl benzyl dextran having a high benzyl D.S. and a low carboxymethyl D.S., said carboxymethyl benzyl dextran having the D.S. of carboxymethyl held to 1.5 and the D.S. of benzyl held to 1.5.

6. A sustained release pharmaceutical product for introducing into the intestinal tract comprising a complex consisting essentially of dextro-amphetamine hydrochloride and carboxymethyl benzyl dextran having a high benzyl D.S. and a low carboxymethyl D.S., said carboxymethyl benzyl dextran having the D.S. of carboxymethyl held to 1.5 and the D.S. of benzyl held to 1.5.

7. A sustained release pharmaceutical product for introducing into the intestinal tract comprising a complex consisting essentially of penicillin and carboxymethyl benzyl dextran, having a high benzyl D.S. and a low carboxymethyl D.S., said carboxymethyl benzyl dextran having the D.S. of carboxymethyl held to 1.5 and the D.S. of benzyl held to 1.5.

8. A sustained release pharmaceutical product for introducing into the intestinal tract comprising a complex consisting essentially of streptomycin and carboxymethyl benzyl dextran having a high benzyl D.S. and a low carboxymethyl D.S., said carboxymethyl benzyl dextran having the D.S. of carboxymethyl held to 1.5 and the D.S. of benzyl held to 1.5.

9. A sustained release pharmaceutical product for introducing into the intestinal tract comprising a complex consisting essentially of chloroprophenyridamine and carboxymethyl benzyl dextran having a high benzyl D.S. and a low carboxymethyl D.S., said carboxymethyl benzyl dextran having the D.S. of carboxymethyl held to 1.5 and the D.S. of benzyl held to 1.5.

10. A sustained release pharmaceutical product which is made by admixing 60 grams of carboxymethyl benzyl dextran in 300 mls. of isopropyl alcohol containing 10 grams of stearic acid, and introducing thereinto 10 grams of dextro-amphetamine hydrochloride, and drying the resultant solution under vacuum to recover a carboxymethyl benzyl dextran modified dextro-amphetamine hydrochloride 11. A sustained release pharmaceutical product consisting of a carboxymethyl benzyl dextran modified dextro-amphetamine, said carboxymethyl benzyl dextran constituting from 1 to 50% by weight of the pharmaceutical product.

References Cited in the file of this patent

UNITED STATES PATENTS

| | | |
|---|---|---|
| 2,536,168 | Goggin | Jan. 2, 1951 |
| 2,609,368 | Gaver | Sept. 2, 1952 |
| 2,749,274 | Buckwalter | June 5, 1956 |
| 2,811,516 | Novak | Oct. 29, 1957 |
| 2,856,398 | Novak | Oct. 14, 1958 |
| 2,885,393 | Herb | May 5, 1959 |
| 2,902,408 | Bouman et al. | Sept. 1, 1959 |
| 2,997,423 | Novak | Aug. 22, 1961 |

OTHER REFERENCES

Whistler, et al.: "Industrial Gums, Polysaccharides and Their Derivatives," pp. 1–14, 531–563, Lib. of Congress, copyright Aug. 4, 1959, pub. by Academic Press, New York, N.Y.